(12) United States Patent
Obermeier

(10) Patent No.: US 7,028,552 B2
(45) Date of Patent: Apr. 18, 2006

(54) RELIABLE PIEZO-RESISTIVE PRESSURE SENSOR

(75) Inventor: Horst Obermeier, Huellhorst (DE)

(73) Assignee: Kavlico Corporation, Moorpark, CA (US)

( * ) Notice: Subject to any disclaimer, the term of this patent is extended or adjusted under 35 U.S.C. 154(b) by 24 days.

(21) Appl. No.: 10/847,563

(22) Filed: May 17, 2004

(65) Prior Publication Data

US 2005/0252298 A1 Nov. 17, 2005

(51) Int. Cl.
*G01L 9/00* (2006.01)

(52) U.S. Cl. .......................... 73/754; 438/53
(58) Field of Classification Search .............. 73/719, 73/720, 721, 726, 727, 754; 438/53
See application file for complete search history.

(56) References Cited

U.S. PATENT DOCUMENTS

| | | | |
|---|---|---|---|
| 5,024,097 A * | 6/1991 | Graeger et al. ............... 73/727 |
| 5,349,867 A | 9/1994 | Park | |
| 6,472,244 B1 * | 10/2002 | Ferrari et al. ................. 438/53 |
| 6,874,367 B1 * | 4/2005 | Jakobsen ...................... 73/718 |
| 2003/0205090 A1 * | 11/2003 | Jakobsen ...................... 73/718 |

* cited by examiner

*Primary Examiner*—Edward Lefkowitz
*Assistant Examiner*—Andre Allen
(74) *Attorney, Agent, or Firm*—Jeffer, Mangels, Butler & Marmaro, LLP

(57) ABSTRACT

A pressure sensor system for measuring the pressure of a corrosive media includes a silicon plate forming a diaphragm and a glass plate or ring bonded to said silicon plate with an opening over the diaphragm. The diaphragm has resistive areas of different orientations to provide first resistive areas which have increased resistance with diaphragm deflection, and other areas which have decreased or little change in resistance with diaphragm deflection. The resistive areas may be formed by doping the silicon plate. The resistive areas have broad doped connectors extending outward to areas beyond the seal between the glass plate or ring, to wire bond areas on the silicon plate. Accordingly, the wire bond pads are not exposed to the corrosive media.

18 Claims, 2 Drawing Sheets

RELIABLE PIEZO-RESISTIVE PRESSURE SENSOR

FIELD OF THE INVENTION

This invention relates to pressure sensors which are subject to adverse or corrosive media.

BACKGROUND OF THE INVENTION

Piezo-resistive pressure sensors are known, and may include a silicon diaphragm with conductive or resistive areas on the surface of the diaphragm. The resistive areas are arranged so that, as the diaphragm deflects, some of the resistive areas increase in resistance, while other areas decrease in resistance or are relatively unchanged. Using appropriate output circuitry, such as a Wheatstone bridge, the output changes are generally proportional to the applied pressure and the resulting deflection of the diaphragm.

The resistance areas and immediately associated connections may be implemented by diffusion of n-type material or p-type material into the surface of the silicon diaphragm. One pair of resistors may have the resistive areas extending radially, while another pair of resistors may have the resistive areas extend circumferentially or perpendicular to a radial line from the center of the diaphragm. Coupling to external circuitry is normally accomplished by wire bonding to pad areas on the silicon diaphragm.

However, in some cases, failure or degradation of the operation of the pressure transducers as described above, have occurred.

SUMMARY OF THE INVENTION

It has been determined that lack of reliability in some cases has been a result of the corrosive media being measured, attacking the wire bonding connections. This problem may particularly occur when the corrosive media involves diesel engine exhaust fumes, or other similarly corrosive media.

The present invention overcomes the problem outlined above by providing a silicon-glass construction in which an apertured glass plate or ring is bonded to a silicon plate into which the diaphragm has been formed. The silicon plate has areas which are not covered by the glass ring or plate, and the resistive areas of the diaphragm have associated semi-conductive lead-in areas which extend beyond the glass ring or plate. The port for the media under test is coupled directly to the opening in the glass plate. Wire bond areas on the silicon plate are provided in locations where the glass plate or ring does not cover the silicon plate. Accordingly, the wire bond pads and wires are protected from the corrosive media.

Additional features of the construction may include the following:

1. The area of the diaphragm exposed to the corrosive media is passivated by a very thin layer of glass or silicon nitride.

2. Fusion or adhesive bonding of the silicon plate to a substrate, which may also be formed of semi-conductive material, such as silicon.

3. The use of an adhesive between the silicon plate and the glass ring or plate, with the adhesive being impervious to the corrosive medium.

4. Instead of silicon, the diaphragm may be formed of other semiconductive or other materials.

Other objects, features and advantages of the invention will become apparent from a consideration of the drawings and the following detailed description.

DETAILED DESCRIPTION OF THE INVENTION

While the specification describes particular embodiments of the present invention, those of ordinary skill can devise variations of the present invention without departing from the inventive concept.

Figure 1:
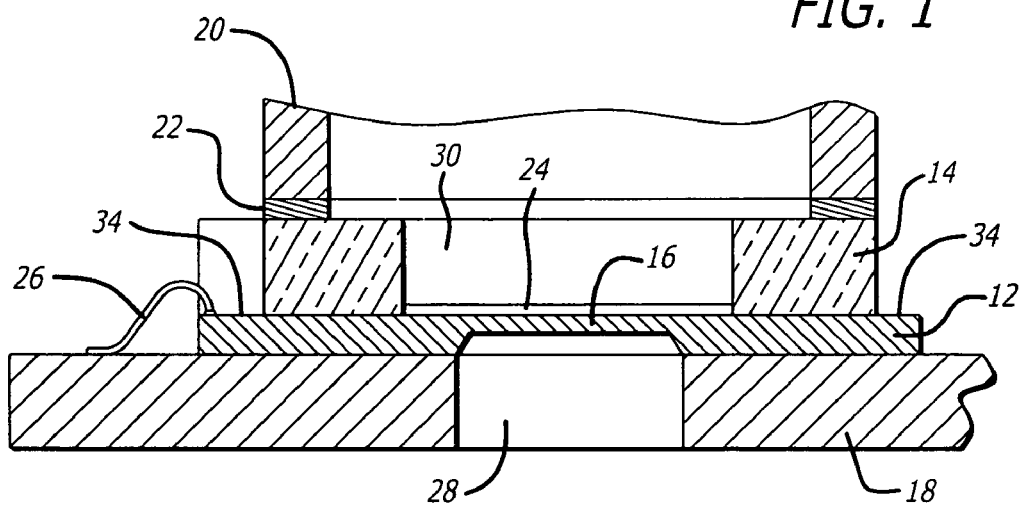
FIG. 1 is a cross-sectional view of a pressure transducer illustrating the principles of the invention.

Referring more particularly to the drawings, FIG. 1 is a cross sectional view of a pressure transducer including a silicon plate 12 and an apertured glass plate 14 bonded to the silicon plate 12. The silicon plate 12 is thinned down, preferably by etching, to provide a diaphragm 16. The silicon plate 12 is bonded to a substrate 18; and a high pressure port 20 is secured to the glass plate 14 by adhesive 22.

The upper surface of the silicon plate 12 may be passivated by a then layer 24 of glass or silicon nitride. Output from the transducer is accomplished by wire bond leads 26, which are conductively connected to areas on the upper surface of silicon plate 12, in an area where the glass ring or plate 14 does not cover the silicon plate 12.

The substrate 18 has an opening 28 aligned with the diaphragm 16 and the opening 30 in the glass plate 28. Incidentally, the deflection of diaphragm 16 will be a function of the pressure on both sides of it, and it therefore constitutes a differential pressure transducer.

Figure 2:
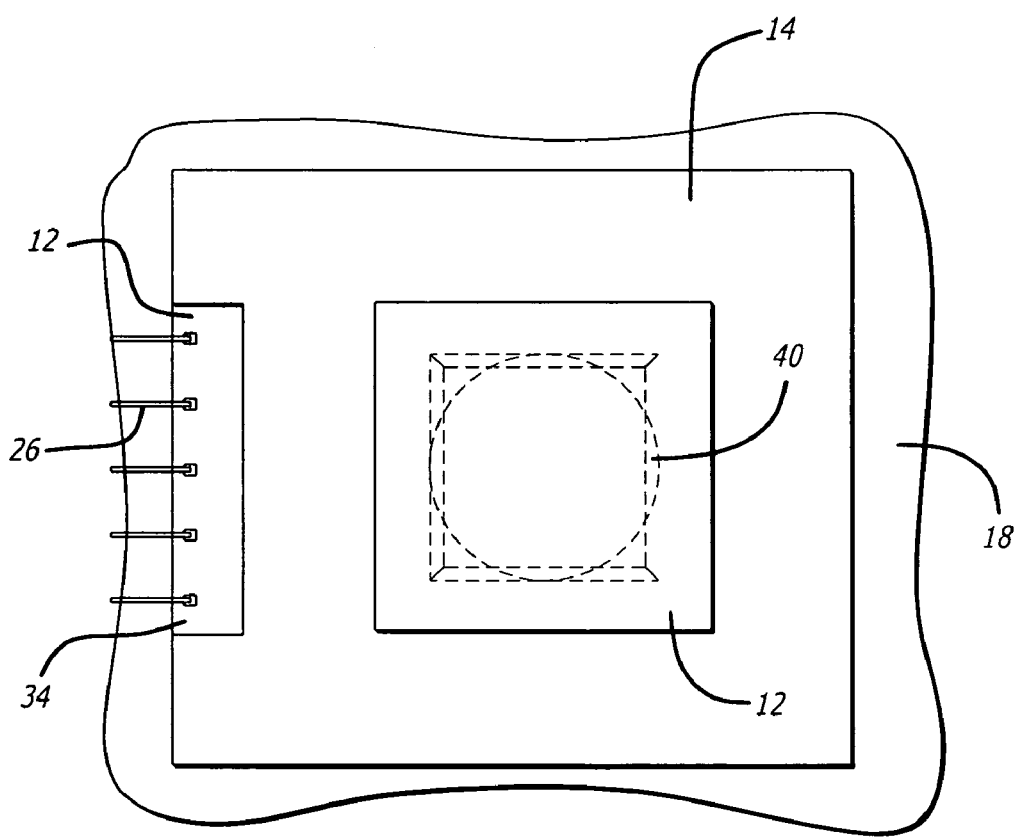
FIG. 2 is a top plan view of the pressure transducer of FIG. 1, with the pressure port not being shown.

Turning now to FIG. 2 of the drawings, it shows the glass plate 14 overlying the silicon plate 12, with the exposed areas 34 of the silicon plate 12 having the wires 26 coupled to the surface conductive paths from the resistive areas on the diaphragm. As indicated at reference numeral 40 in FIG. 2, the diaphragm and/or the openings 30 and 28 in the glass plate 14 and/or substrate 18, may be either round or square, or of other convenient shapes.

Figure 3:
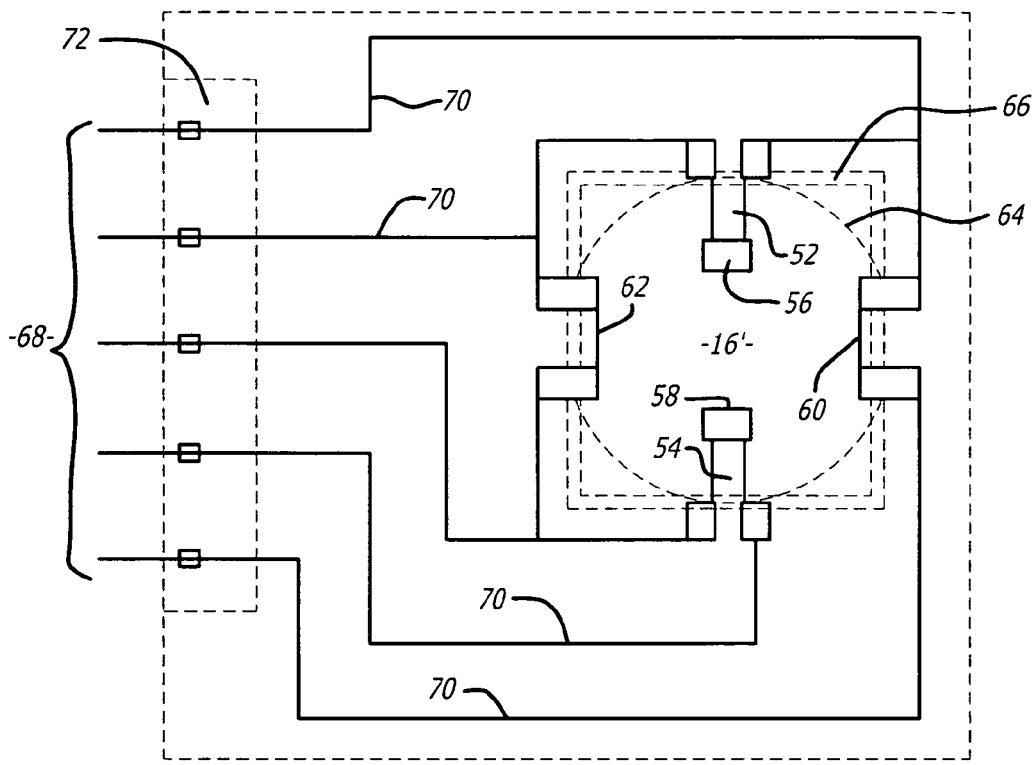
FIG. 3 is a more detailed view of the silicon plate showing one illustrative configuration of the resistive elements.

FIG. 3 is an alternative diagrammatic showing of a pressure transducer with the resistive areas on the diaphragm 16' being shown. In this regard, note the resistive areas 52 and 54 mounted radially on the diaphragm 16'. The active resistive elements 52 and 54 are inter-connected by the broader pads 56 and 58. As the diaphragm flexes, the length of the resistive elements 52 and 54 increases, and the width decreases, this causing an increase in resistance. This is in contrast to the resistive elements 60 and 62 which extend circumferentially or perpendicular to a radial line, so that their width increases or is little changed, and the resistance decreases to some extent or is unchanged.

In FIG. 3 the dashed lines 64 or 66 represents the location of the glass plate opening which is generally coextensive with the diaphragm; and one configuration of the glass pate is also defined by dashed lines in FIG. 3. At the left hand side of FIG. 3, the wires 68 are coupled to the semi-conductor leads or printed circuit leads 70 at the wire bond pad area 72.

Figure 4:
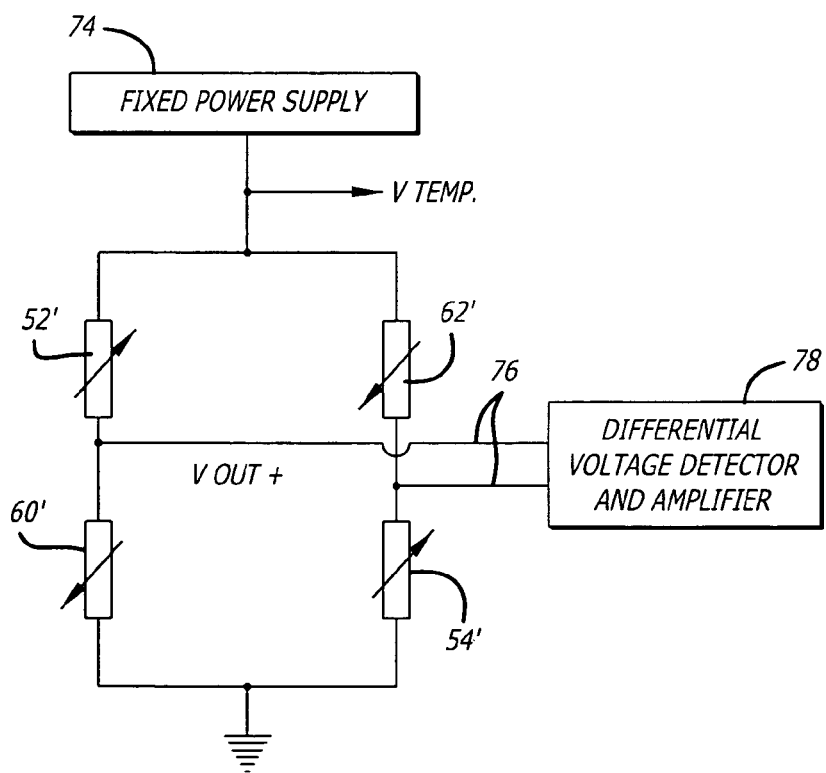
FIG. 4 shows a Wheatstone bridge output circuit.

FIG. 4 is a simple Wheatstone bridge circuit with resistors 52', 54', 60' and 62' connected as indicated. The fixed voltage input source is indicated at reference numeral 74 and the output appears at leads 76.

When the diaphragm is not deflected, the bridge is balanced, and the same voltage appears at the two output leads. However, when the diaphragm deflects, resistors 52' and 54' increase in resistance, and resistors 60' and 62' decrease, or are not changed significantly. The result is unbalancing of the bridge to provide a difference in potential across the output leads 76. An appropriate differential voltage detector and amplifier 78 is connected to output terminals 76.

Incidentally, basic pressure transducers such as that shown in FIG. 3, but terminating at the conductive areas just outside the diaphragm, are available commercially, from either of the two following companies: GE NovaSensor, 1055 Mission Court, Fremont, Calif. 94539 and SensoNor, ASA, P.O. Box 196, N-3191 Horten. N, Norway.

With regard to the formation of the diaphragm and bonding to the substrate, reference is made to U.S. Pat. No. 5,578,843 granted Nov. 26, 1996, and that patent is hereby incorporated by reference into this specification. Reference is also made to U.S. Pat. No. 5,349,867 which shows a pressure transducer including Wheatstone bridge and differential voltage detection and amplification circuitry.

In closing, in the foregoing specification and in the drawings, preferred embodiments of the invention are disclosed. However, it is to be understood that various changes and modifications may be made without departing from the spirit and scope of the invention. Thus, by way of example and not of limitation, other semi-conductors or other materials may be employed as the diaphragm, and also for the substrate and for the glass plate. The diaphragm and the associated openings in the substrate, the glass plate or ring and the pressure input port may be circular, square, or of other shapes. The glass plate or ring may be a ring closely limited to the diaphragm or may be an apertured plate extending over the silicon plate with only a small exposed area. Instead of resistance sensing, capacitive sensing may be employed. Accordingly the invention is not limited to the exact configuration and construction as described hereinabove.

I claim:

1. A reliable pressure transducer system comprising:
a silicon plate having a reduced thickness area forming a diaphragm, said silicon plate having an active side;
a glass plate or ring overlying and bonded to said silicon plate on said active side of said silicon plate and having an opening over the diaphragm;
said silicon plate having an exposed extent beyond said glass plate or ring;
resistive areas formed by semiconductive doping on a surface of the diaphragm; selected resistive areas being formed on said diaphragm to increase resistance with deflection of said diaphragm, and selected resistive areas being formed on said diaphragm to reduce resistance or to have little change in resistance with deflection of said diaphragm;
conductive paths formed on said silicon plate extending beyond said glass plate to wire bond pads on said exposed extent of said silicon plate; said conductive paths being coupled to said resistive areas; and
circuitry coupled to said wire bond pads for providing an output signal that varies with a pressure applied to said diaphragm.

2. A reliable pressure transducer system as defined in claim 1 further comprising a very thin passivation layer extending over a portion of said diaphragm.

3. A reliable pressure transducer system as defined in claim 1 further comprising an input pressure port coupled to said glass plate and being bonded thereto by adhesive that is impervious to said media being sensed by said system.

4. A reliable pressure transducer system as defined in claim 1 wherein said circuitry includes a Wheatstone bridge.

5. A reliable pressure transducer system as defined in claim 1 wherein said glass plate and said silicon plate are anodically bonded to one another.

6. A reliable pressure transducer system as defined in claim 1 wherein said active side of said silicon plate facing said glass plate or ring is substantially flat and another side of said silicon plate has an etched recess forming said diaphragm.

7. A reliable pressure transducer system comprising:
a semiconductor plate having a reduced thickness area forming a diaphragm, said silicon plate having an active side;
a glass plate or ring overlying and bonded to said semiconductor plate on said active side of said silicon plate and having an opening over said diaphragm;
said semiconductor plate having an exposed extent beyond said glass plate or ring;
resistive areas formed by semiconductive doping on a surface of said diaphragm; selected resistive areas being formed on said diaphragm to increase resistance with deflection of said diaphragm, and selected resistive areas being formed on said diaphragm to reduce resistance or to have little change in resistance with deflection of said diaphragm;
conductive paths formed on said semiconductor plate extending beyond said glass plate to wire bond pads on said exposed extent of said semiconductor plate; said conductive paths being coupled to said resistive areas; and circuitry coupled to said wire bond pads for providing an output signal that varies with said pressure applied to said diaphragm.

8. A reliable pressure transducer system as defined in claim 7 further comprising a very thin passivation layer extending over a portion of said diaphragm.

9. A reliable pressure transducer system as defined in claim 7 further comprising an input pressure port coupled to said glass plate and being bonded thereto by adhesive that is impervious to a media being sensed by said system.

10. A reliable pressure transducer system as defined in claim 7 wherein said circuitry includes a Wheatstone, bridge.

11. A reliable pressure transducer system as defined in claim 7 wherein said glass plate and said semiconductor plate are anodically bonded to one another.

12. A reliable pressure transducer system as defined in claim 7 wherein said active side of said semiconductor plate facing said glass plate or ring is substantially flat and another side of said silicon plate has an etched recess forming said diaphragm.

13. A reliable pressure transducer system comprising:
a semiconductor plate having a reduced thickness area forming a diaphragm, said silicon plate having an active side;
a glass plate or ring overlying and bonded to said semiconductor plate on said active side of said silicon plate and having an opening over said diaphragm;
said semiconductor plate having an exposed extent beyond said glass plate or ring;

sensors coupled to said diaphragm that vary in electrical properties with deflection of said diaphragm; conductive paths formed on said semiconductor plate extending beyond said glass plate to wire bond pads on said exposed extent of said semiconductor plate; said conductive paths being coupled to said sensors; and circuitry coupled to said wire bond pads for providing an output signal that varies with said pressure applied to said diaphragm.

14. A reliable pressure transducer system as defined in claim 13 further comprising a very thin passivation layer extending over a portion of said diaphragm.

15. A reliable pressure transducer system as defined in claim 13 further comprising an input pressure port coupled to said glass plate and being bonded thereto by adhesive that is impervious to a media being sensed by said system.

16. A reliable pressure transducer system as defined in claim 13 wherein said circuitry includes a Wheatstone bridge.

17. A reliable pressure transducer system as defined in claim 13 wherein said glass plate and said semiconductor plate are anodically bonded to one another.

18. A reliable pressure transducer system as defined in claim 13 wherein said active side of said semiconductor plate facing said glass plate or ring is substantially flat and another side of said silicon plate has an etched recess forming said diaphragm.

* * * * *